United States Patent

Thayer et al.

[15] 3,653,049
[45] Mar. 28, 1972

[54] COLLISION WARNING SYSTEM

[72] Inventors: Patrick T. Thayer; Robert V. Munson, both of Antonio, Tex.

[73] Assignee: Marquart Industrial Products Co., Cucamonga, Calif.

[22] Filed: Dec. 5, 1969

[21] Appl. No.: 882,534

[52] U.S. Cl. .................................343/112 CA, 343/113 R
[51] Int. Cl. ...........................................G01s 3/22, G08g 5/04
[58] Field of Search....................................343/112 CA, 113

[56] References Cited

UNITED STATES PATENTS 3,378,839  4/1968  Ross....................................343/113 X
3,345,633  10/1967  Runge..............................343/112 CA
3,412,402  11/1968  Beckwith..........................343/112 CA Primary Examiner—Rodney D. Bennett, Jr.
Assistant Examiner—Richard E. Berger
Attorney—Giles C. Clegg, Jr. and Peter J. Murphy

[57] ABSTRACT

A collision warning system adapted to be carried by a host aircraft and which detects the radio frequency transmission from an intruder aircraft in its vicinity. The antenna arrangement provides information as to the compass quadrant of the other aircraft while changes in the intensity of the received radio frequency signals are displayed to provide an indication of the closure rates between the two aircraft.

25 Claims, 7 Drawing Figures

PATENTED MAR 28 1972 3,653,049

INVENTOR

ROBERT V. MUNSON
PATRICK T. THAYER

ATTORNEYS

INVENTOR
ROBERT V. MUNSON
PATRICK T. THAYER

ATTORNEYS

| | 12 | 14 | 16 | 18 | 20 | 22 | 24 | 26 |
|---|---|---|---|---|---|---|---|---|
| A | X | | | | | | | |
| A+B | — | X | — | | | | | |
| B | | | X | | | | | |
| B+C | | | — | X | — | | | |
| C | | | | | X | | | |
| C+D | | | | | — | X | — | |
| D | | | | | | | X | |
| D+A | | | | | | | — | X |

X = ON
— = INHIBIT

INVENTOR
ROBERT V. MUNSON
PATRICK T. THAYER

ATTORNEYS

INVENTOR
ROBERT V. MUNSON
PATRICK T. THAYER

ATTORNEYS

COLLISION WARNING SYSTEM

BACKGROUND OF THE INVENTION

The aviation industry has long felt a need for a practical collision warning system. A substantial amount of time and money has been invested in attempts to satisfy this need. Much of this effort has been in the development of very sophisticated and expensive systems applicable to airline use. However, the number of general aviation aircraft is much greater than the number of commercial aircraft and the number of general aviation aircraft is increasing at a very rapid rate. Accordingly, it is desirable that a simple, inexpensive collision warning system be provided that can be utilized by light aircraft and which does not place an extreme financial burden upon the aircraft operator but which is compatible with the more sophisticated systems.

Many important benefits can be derived from a simple pilot warning indicator. Thus, studies have revealed that a simple pilot warning indicator which indicates to the pilot of a host aircraft the quadrant in which an intruder aircraft is located increases greatly the probability of detecting the intruder aircraft. The intruder aircraft will be detected much earlier with the assistance of a pilot warning system, permitting increased time in which to evaluate the threat of the intruding aircraft and take appropriate manuevers to avoid it.

SUMMARY OF THE INVENTION

The present invention provides a pilot warning indicator which indicates the one of eight sectors in which intruder aircraft is located. The system also provides indication of relative closure rate. It has been found possible by using the present invention to achieve results comparable to that obtained by high azimuth resolution systems.

In accordance with the present invention, an antenna system is provided, preferably one which is capable of covering four quadrants. Detector means is associated with the antenna system for detecting the presence of r.f. energy having a frequency within a selected frequency band. There is also provided signal generating means responsive to the output of the detector means for providing signals indicating receipt of r.f. energy of a frequency of interest and means responsive to coincidence and lack of coincidence signals from the signal generating means for indicating the sector from which the radio frequency energy is received.

In accordance with the preferred embodiment of the invention, the antenna system comprises four antennas, each of which receives energy from a ninety degree quadrant with a certain amount of overlap between adjacent quadrants. Overlap of the antenna scan is provided to give eight segment resolution in the indication. The indicator used is, in accordance with the preferred embodiment of the invention, a multiple gun cathode ray tube which works on the shadow mask principle and has eight of its guns provided with arrow cutouts oriented 45° apart. When displayed on the screen by the arrival of alarm pulses, the arrows will point to the position of the intruder aircraft and will flash at a rate related to the closure speed between the two aircraft.

BRIEF DESCRIPTION OF THE DRAWINGS

Many objects and advantages of the invention will become apparent to those skilled in the art as detailed description of the invention unfolds in conjunction with the appended drawings wherein like reference numerals denote like parts and in which.

Figure 1:
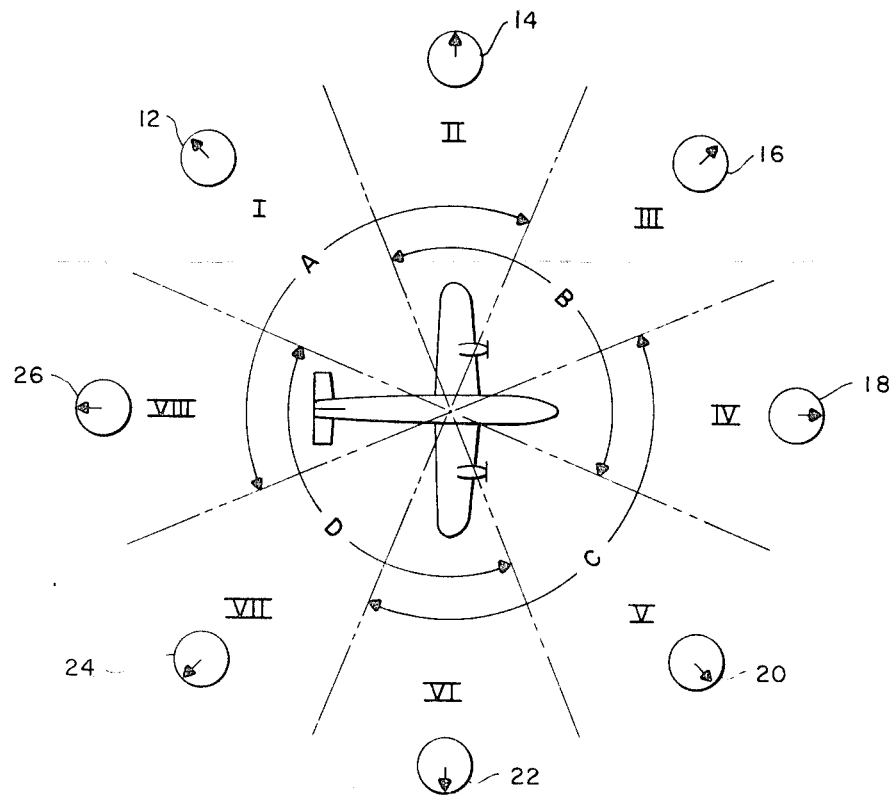
FIG. 1 is a plan view showing the quadrants scanned by individual antennas in the antenna system and illustrating the type of indication provided upon the presence of an intruder aircraft in certain sectors.

DESCRIPTION OF PREFERRED EMBODIMENTS:

FIG. 1 is a plan view of an aircraft 10 having an antenna system which includes four antennas. One of the antennas would scan zone or quadrant A of 135°. The second antenna would scan zone or quadrant B of 135°, the third antenna would scan zone or quadrant C of 135° and the fourth antenna would scan zone or quadrant D of 135°. As a result of the overlap of the antennas, there is provided eight sectors I - VIII. Sector I comprises a portion of quadrant A in which there is no overlap with quadrants B and D. Sector II comprises a sector in which there is overlap between quadrants A and B. Sector III is one which is covered by quadrant B with no overlap from quadrants A or C. Sector IV is one in which quadrants B and C overlap, Sector V is a portion of quadrant C in which there is no overlap from quadrants B or D, Sector VI is a sector scanned by quadrant D with no overlap from quadrants A or C and Sector VIII is one in which there is overlap between Sectors A and D. A different indication is provided for each sector as shown schematically by the cathode ray displays 12 thru 26.

Figure 2:
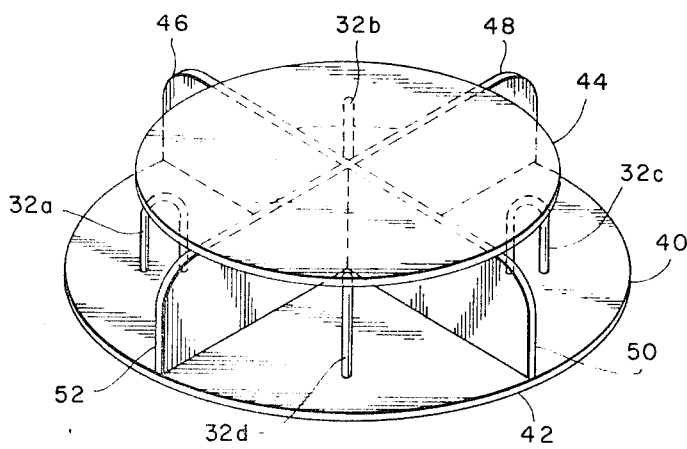
FIG. 2 is a perspective view schematically illustrating an antenna used in the preferred embodiment of the invention.
Figure 3:
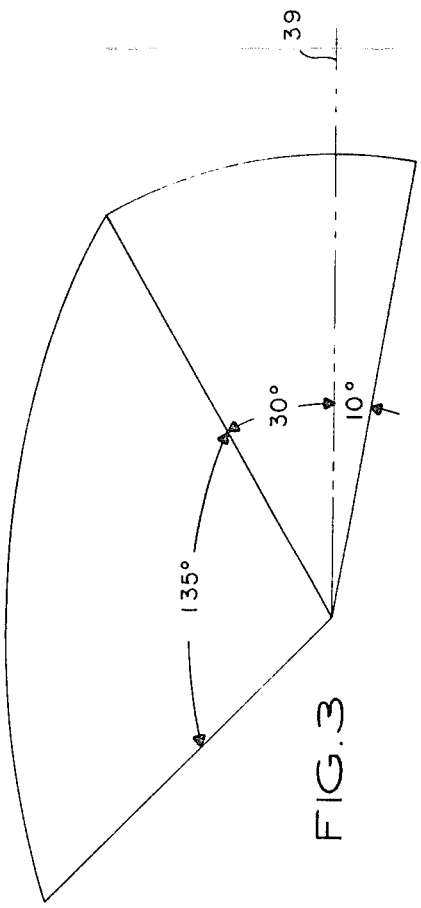
FIG. 3 is a view showing the scan of each antenna.

The antenna system is preferably as shown in FIG. 2 of the drawing and includes four separate antennas 32a – 32d. Each of the antennas is of the directional type and is suitably of a conventional loop type mounted on a disc shaped member 40 of material which attenuates electromagnetic energy. The disc shaped member 40 is mounted parallel to a desired reference plane 39 of the aircraft with each of the antennas disposed sufficiently far from the edge 42 of the disc 40 that energy will be received by each of the antennas from a source disposed 10° below the plane of the antenna. Still a second disc member 44 is positioned above the disc 40 with the antennas positioned between the two discs. The disc 44 is of a lesser diameter than the disc 40 such that energy can be received from a source 30° above the reference plane of the antenna. Vertically disposed separating members 46, 48, 50 and 52 which extend between the lower disc member 40 and the upper disc also provided for establishing the scan quadrants. It will be noted that each of the separating elements are separated from the other by 90°. However, rather than mount the antennas at the point at which the baffle members are joined, the antenna is positioned in the segment at a point such that the actual scan quadrant is 135°. As shown in FIG. 3 of the drawings, each antenna receives energy from a horizontally disposed arc of 135° whose apex terminates at the antenna with the vertical resolution being 10° below the horizontal plane and 30° above a reference plane.

Figure 4:
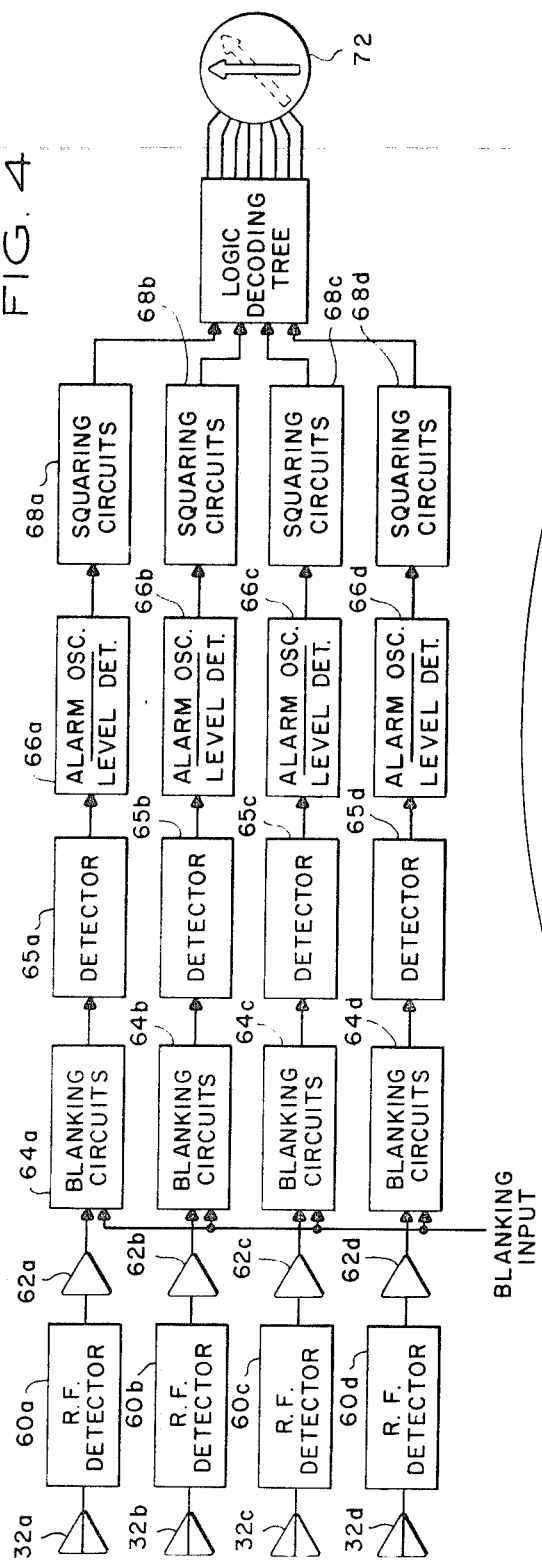
FIG. 4 is a block diagram illustrating one embodiment of the present invention.

The preferred embodiment of the present invention is shown in block diagram form in FIG. 4 of the drawings and can be seen to include the four antennas 32a – 32d. The radio frequency transmission from the transponder or distance measuring equipment ment or other source of energy of another aircraft are received by the antennas and applied to detectors 60a – 60d which envelope detects the signals. The detectors 60a – 60d can be of any suitable type well known in the art and may include provision for either pulse width discrimination or pulse pair discrimination or detector integration to prevent interference from long range ground radars. Alternatively, the detectors can include a band pass capability to prevent interference from long range radars. The output of each detector is applied to one of the preamplifiers 62a – 62d, also suitably of conventional design, which amplifies the detected signal and provides a signal of usable level to the blanking circuit 64a – 64d. The blanking circuits 64a – 64d are desirable to prevent interference with the pilot warning indicator from transmitters carried by the host aircraft. The blanking circuits are of conventional type and suitably comprise an amplifier which is disabled when a blanking pulse is present. A blanking input is, as convention, provided when the aircraft transmitters are operated. The outputs of the blanking circuits are preferably applied to detector circuits 65*1* – 65*d* which can be, for example, diode-capacitor integrator circuits which produce a DC output voltage whose level varies in accordance with the number of pulses present in a unit time and the amplitude of the pulses. The output of the detectors 65*1* – 65*d* are applied to the alarm oscillator and level detector circuits 66*a* – 66*d* respectively which are responsive to the DC signal output of the detector exceeding a threshold level. When the threshold level is exceeded, the oscillator is triggered and the frequency of oscillation will be a function of the amplitude of the video signal over the threshold level. The detector circuits 65*a* – 65*d* are not required and it is practical to connect the blanking circuit directly to the alarm oscillator and level detector circuits. The outputs from the alarm oscillators are applied to squaring circuits 68*a* – 68*d*. The alarm oscillator circuit can be a conventional relaxation oscillator whose frequency of oscillation varies as a function of the amplitude of impressed voltage.

The squaring circuits are conventional saturating amplifiers which provide clipped or squared output pulses responsive to each pulse from the associated alarm oscillator circuit. Provision of squaring circuits is desirable as it facilitates digital processing, but is not required. The output of each squaring circuit is applied to a logic decoding tree 70. The output of the logic decoding tree 70 is applied to a ten gun cathode ray tube indicator 72 for controlling the indication provided by the cathode ray tube.

Figures 5, 6:
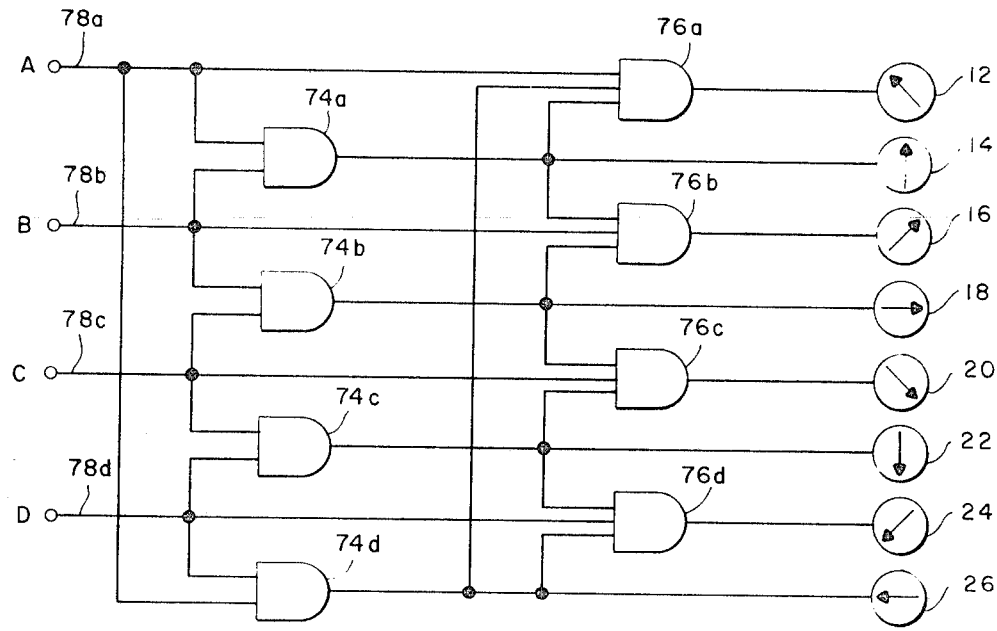
FIG. 5 is a block diagram showing a logic tree in accordance with the present invention in greater detail.
FIG. 6 is a table illustrating operation of the logic circuitry of FIG. 5.

A preferred example of a logic decoding tree 70 is shown in FIG. 5 of the drawings. It includes four AND-gates 74*a* – 74*d* and four OR-gates 76*a* – 76*d*.

The signal from the squaring circuit 68*a* is applied thru line 78*a* to one input of AND-gates 74*a* and 74*d* and to one input of the OR-gate 76*a*. Similarly, the output from the squaring circuit 68*b* is applied thru line 78*b* to one input of each AND-gate 74*a* and 74*b* and to one input of the OR-gate 76*b*. Line 78*c* which extends from the squaring circuit 68*c* is connected to one input of each of the AND-gates 74*b* and 74*c* and to an input of OR-gate 76*c*. Line 78*d* from squaring circuit 68*d* is connected to the input of each of the AND-gates 74*c* and 74*d* and to an input of the OR-gate 76*d*. The output of each of the AND-gates 74*a* – 74*d* and each of the OR-gates 76*a* – 76*d* are each applied to the cathode ray tube 52 to provide indication 12–26 as shown in the table of FIG. 6.

Thus, for example, if a source of radio energy of the selected frequency band is present in sector I, only antenna 32*a* will receive a signal and, accordingly, a signal will be present on line 78*a* but not lines 78*b*, 78*c* and 78*d*. The signal will not be passed by gates 74*a* and 74*d*, but will be passed by gate 76*a* to provide an indication indicated by the reference character 12. If, on the other hand, the source of radio energy is present in sector II, both antennas 32*a* and 32*b* will receive a signal and a signal will be present on both lines 78*a* and 78*b*. A signal will be produced at the output of gate 74*a* which is applied to one input of each of the gates 76*a* and 76*b* and to the cathode ray tube 52, causing the cathode ray tube to provide an indication as indicated at 14. Since more than one signal is applied to the input of gates 76*a* and 76*b*, neither of the gates will have an output signal. In similar fashion, the various indications indicated at 16, 18, 20, 22, 24 and 26 of FIG. 5 will be produced responsive to the sector or sectors in which the source of detected r.f. energy is located.

A system as described above will provide the desired indication of proximity of another aircraft, and the proximate direction to the aircraft. Some indication of separation is provided by use of the level detector in that the received signals must be of at least a predetermined strength to produce an indication. It will be appreciated, in this regard, that the transmitters from which the signals are received will be of varying power. However, in general, this is advantageous in that the larger, high speed aircraft will normally be equipped with the higher wattage output transmitters and warning of their presence signalled at greater distances than would be true of slower flying aircraft. Indication of closure rate and distance is provided since the indications provided by the cathode ray tube 72 flash at a rate which is a function of the amplitude of the received r.f. signal. An increase in flashing rate indicated closure with the rate of increase of the flashing rate being a function of the rate of closure. The rate of flashing indicates relative distance since the strength of the received signal is a function of distance to the transmitter.

The embodiment of the invention shown in FIG. 4 provides a desired indication to the pilot of the proximity of another aircraft. However, an ambiguous indication will be provided if two aircraft are located in areas scanned by two adjacent antennas. Thus, if one aircraft is in quadrant A and a second aircraft is in quadrant B, the embodiment of the invention as shown in FIG. 4 would provide an indication of a single aircraft in sector II even though one of the aircraft was actually in sector I and the second aircraft was actually in sector III. The embodiment of the invention shown in FIG. 7 distinguishes between the above two situations and also provides discrimination against signals received from rotating antennas of the type used in many radar installations.

Figure 7:
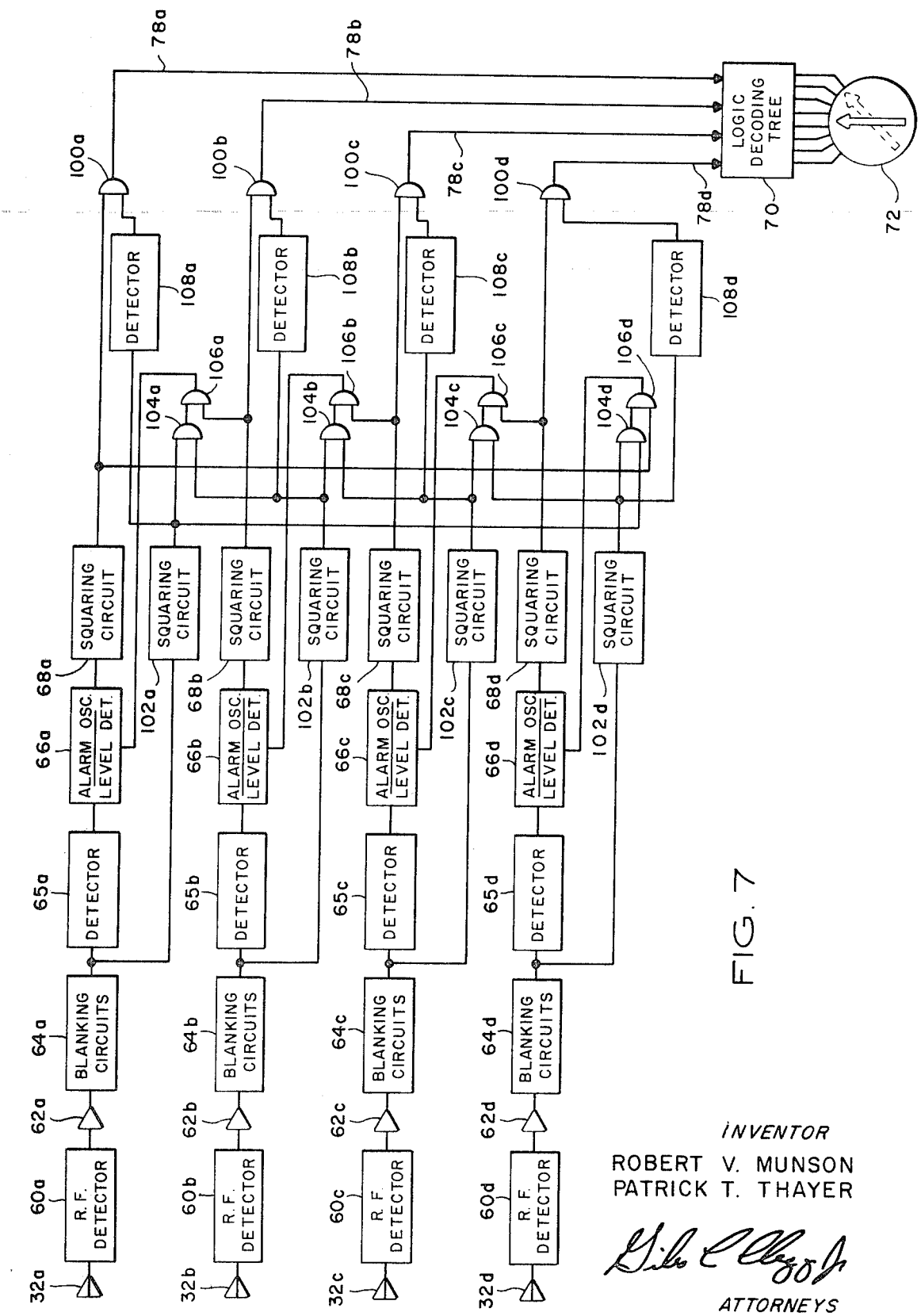
FIG. 7 is a block diagram illustrating a second embodiment of the invention.

In accordance with the embodiment of the invention shown in FIG. 7, the output of each of the squaring circuits 68*a* – 68*d* are applied to one input of AND-gates 100*a* – 100*d* respectively. The outputs of the AND-gates 100*a* – 100*d* are applied to the line 78*a* – 78*d* respectively. Accordingly, signals will be applied to lines 78*a* – 78*d* only when a signal is present at both inputs to the associated AND-gates 100*a* – 100*d*.

The outputs of each of the blanking circuits 64*a* – 64*d* are also applied to input of squaring circuits 102*a* – 102*d* respectively. The outputs of each of the squaring circuits 102*a* – 102*d* are applied to one input of AND-gates 104*a* – 104*d* respectively. The output of each of the AND-gates 104*a* – 104*d* is applied to one input of each of the AND-gates 106*a* – 106*d* respectively. The output of each of the AND-gates 106*a* – 106*d* is applied to the alarm oscillator level detector circuits 66*a* – 66*d* respectively. The output of each of the squaring circuits 102*a* – 102*d* is also applied to the input of detectors 108*a* – 108*d* respectively which are suitably of the same type as detectors 65*a* – 65*d*. The output of each of the detectors 108*a* – 108*d* is applied to the other input of each of the AND-gates 100*a* – 100*d*. The output of squaring circuit 68*a* is applied to the other input of AND-gate 106*d*. Similarly, the output of squaring circuits 68*b* – 68*d* are applied to the other inputs of AND-gates 106*a* – 106*c* respectively. The output of squaring circuit 102*a* is applied to the other input of AND-gate 104*d* and similarly, the output of the squaring circuits 102*b* and 102*d* are applied to the other inputs of each of the AND-gates 104*a* – 104*c* respectively.

In understanding the operation of the embodiment of the invention as shown in FIG. 7 of the drawings, it is important to note that the output of each of the detector circuits 60*a* – 60*d* will normally be pulses approximately 3 to 5 microseconds in duration with a relatively low pulse repetition rate of approximately 3–400 pulses per second.

The operation of the embodiment of the invention shown in FIG. 7 can perhaps best be understood with reference to a specific example in which it is assumed that a single aircraft is located in sector II. Accordingly, radiation from the transmitter located on the aircraft will be received by the antennas of quadrants A and B and video pulses will be produced at the output of each of the blanking circuits 64*a* and 64*b*. Each of the squaring circuits 102*a* and 102*b* will provide square wave output pulses which are in phase and which are applied to the two inputs of the AND-gates 104*a*, causing the AND-gate 104*a* to provide an output pulse which is applied to one input of AND-gate 106*a*. Another input will be applied to AND-gate 106*a* from squaring circuit 68*b* as a result of operation of the alarm oscillator level detector 66*b*, causing a synchronizing pulse to be applied to alarm oscillator level detector 66*a* which will cause the alarm oscillator level detector 66*a* to oscillate in synchronism with the alarm oscillator 66b. Both of the detectors 108a and 108b will provide inputs to AND-gates 100a and 100b and accordingly, the AND-gates 100a and 100b will have outputs in synchronism with the output signals from the oscillator 66a and 66b respectively. The logic decoding tree 70 therefore causes the cathode ray tube 72 to provide an indication 14 as described previously with reference to FIG. 5 of the drawings.

If, on the other hand, one aircraft is located in quadrant A and a second aircraft is located in quadrant B, the pulses produced at the output of blanking circuit 64a and 64b will not be in synchronism. Accordingly, an output will not be produced from AND-gate 104a and the alarm oscillators 66a and 66b will not be operated in synchronism, but rather will be out of synchronism. It is important to note, in this regard, that the output of the alarm oscillator 66a – 66d are also characterized by a low duty cycle and that the probability of any two alarm oscillators being in synchronism is extremely small. Since the outputs appearing on line 78a and 78b will not be in synchronism, an output will not be produced from AND-gate 74a and accordingly, the cathode ray tube will produce both indications 12 and 16.

From the foregoing, it can be seen that embodiment of the invention shown in FIG. 7 of the drawings is capable of distinguishing between two aircraft positioned in adjacent quadrants and a single aircraft positioned in one of the segments to cause r.f. energy to be received by adjacent antennas. While advantageous and preferred, it is not required in that the embodiment of the invention shown in FIG. 4 of the drawings will indicate to the pilot the general location of aircraft. Further, by appropriately constructing either detector 65a or detector 108a, discrimination from noise and signals from rotating antennas can be obtained in that the detector output will not attain a level sufficient to produce operation of the indicator 72 if signals are not received substantially continuously.

Although the invention has been described with reference to a particular preferred embodiment thereof, many changes and modifications will become apparent to those skilled in the art in view of the foregoing description which is intended to be illustrative and not limiting the invention defined in the appended claims.

What we claim is:

1. A collision warning system to be carried by a host aircraft and responsive to radio frequency signals of a selected frequency band from an intruder aircraft for indicating the position of the intruder aircraft comprising:
   a. A plurality of antennas each mountable on the host aircraft in a fixed, predetermined position relative to the heading of the aircraft and each adapted for receiving radio frequency energy from a different one of a plurality of zones;
   b. Detector means associated with each of said antennas for detecting the presence of radio frequency energy of a selected frequency band;
   c. Pulse means associated with each of said detector means responsive to the output of the associated detector means for providing signals indicating receipt of radio frequency energy by said associated antenna; and
   d. Indicator means responsive to coincidence and lack of coincidence of signals from said pulse means for indicating the one sector of a plurality of sectors from which the radio frequency energy is received, said sectors being greater in number than said antennas.

2. A system as defined in claim 1 including means for shielding each of said antennas to provide a scan of desired horizontal and vertical arc.

3. A system as defined in claim 2 wherein the scan of adjacent antennas overlap.

4. A system as defined in claim 3 wherein the overlap is one-third of the horizontal scan arc.

5. A system as defined in claim 2 wherein the vertical scan arc includes portions above and below a reference plane.

6. A system as defined in claim 1 wherein said indicator means includes a cathode ray tube.

7. A system as defined in claim 6 wherein said cathode ray tube includes a number of guns at least equal to the number of said plurality of sectors.

8. A system as defined in claim 7 wherein said indicator means includes a logic tree for applying signals to said cathode ray tube to actuate said guns in accordance with coincidence and lack of coincidence of signals from said pulse means.

9. A system as defined in claim 8 wherein said pulse means is only responsive to signals of at least a predetermined amplitude.

10. A system as defined in claim 9 wherein said pulse means is further effective for generating signals to control said indicator means to cause said cathode ray tube to flash at a rate which is a function of the closure rate of another aircraft with the host aircraft.

11. A system as defined in claim 8 wherein said logic tree includes a first plurality of gates each associated with a respective one of said antennas and a second plurality of gates each associated with a respective pair of said antennas, each of said first and second plurality of gates controlling a respective one of the guns of said cathode ray tube.

12. A system as defined in claim 1 further including a blanking means for preventing operation of said system when equipment carried by the host aircraft is operated to transmit radio frequency energy of the selected frequency band.

13. A system as defined in claim 1 wherein each said pulse means includes signal generating means for generating signals and including synchronizing means responsive to coincidence of signals received by two adjacent antennas for synchronizing the associated signal generating means.

14. A system as defined in claim 1 wherein said pulse means each comprise a relaxation oscillator for providing output signals whose frequency varies as a function of the amplitude of the received radio frequency energy when the amplitude is in excess of a predetermined level.

15. A system as defined in claim 13 wherein said synchronizing means comprises first and second AND gates associated with each pair of antennas.

16. A system as defined in claim 1 wherein the number of sectors indicated by the indicator means is equal to twice the number of antennas.

17. A system as defined in claim 1 wherein: the antennas comprise four antennas covering different ones of the four quadrants in the horizontal plane of the aircraft wherein the scan of adjacent antennas overlap in such horizontal plane; the detector means includes four individual detector circuit means individually coupled to different ones of the antennas; the pulse means includes four individual pulse generating circuit means individually coupled to different ones of the detector circuit means for providing pulse signals indicating receipt of radio frequency energy by the corresponding ones of the antennas; the indicator means includes eight indicator elements for providing individual indications of different ones of eight different sectors from which radio frequency energy may be received in the horizontal plane of the aircraft; and the indicator means further includes logic circuit means coupled between the four pulse generating circuit means and the eight indicator elements for actuating the indicator element corresponding to the sector from which radio frequency energy is being received.

18. A system as defined in claim 1 wherein the detector means includes pulse width discriminating means for minimizing interference from undesired sources of radio frequency energy.

19. A system as defined in claim 1 wherein the detector means includes pulse pair discriminating means for minimizing interference from undesired sources of radio frequency energy.

20. A system as defined in claim 1 wherein the detector means includes band pass filtering means for minimizing interference from undesired sources of radio frequency energy.

21. A system as defined in claim 1 wherein the indicator means includes a plurality of indicator elements for providing individual indications for the different ones of said sectors.

22. A system as defined in claim 21 wherein said indicator means includes a logic tree for applying signals to said indicator elements to actuate said elements in accordance with coincidence and lack of coincidence of signals from said pulse means.

23. A system as defined in claim 22 wherein said pulse means is only responsive to signals of at least a predetermined amplitude.

24. A system as defined in claim 23 wherein said pulse means is further effective for generating signals to control said indicator means to cause said indicator elements to flash at a rate which is a function of the closure rate of another aircraft with the host aircraft.

25. A system as defined in claim 22 wherein said logic tree includes a first plurality of gates each associated with a respective one of said antennas and a second plurality of gates each associated with a respective pair of said antennas, each of said first and second plurality of gates controlling a respective one of the indicator elements.

* * * * *